(12) United States Patent  
Ulrich

(10) Patent No.: US 8,505,035 B2  
(45) Date of Patent: Aug. 6, 2013

(54) METHOD FOR PROVIDING REFERENCE DATA FOR A DIAGNOSIS OF A SYSTEM DEPENDENT ON AN EVENT TRACE

(75) Inventor: Andreas Ulrich, München (DE)

(73) Assignee: Siemens Aktiengesellschaft, Munich (DE)

( * ) Notice: Subject to any disclaimer, the term of this patent is extended or adjusted under 35 U.S.C. 154(b) by 661 days.

(21) Appl. No.: 12/451,890

(22) PCT Filed: May 28, 2008

(86) PCT No.: PCT/EP2008/056519  
§ 371 (c)(1),  
(2), (4) Date: Dec. 4, 2009

(87) PCT Pub. No.: WO2008/148670  
PCT Pub. Date: Dec. 11, 2008

(65) Prior Publication Data  
US 2010/0107180 A1  Apr. 29, 2010

(30) Foreign Application Priority Data

Jun. 6, 2007  (EP) ..................................... 07011166  
Sep. 19, 2007  (EP) ..................................... 07018397

(51) Int. Cl.  
*G06F 11/00*  (2006.01)  
*G06F 3/00*  (2006.01)

(52) U.S. Cl.  
USPC ................................. 719/318; 714/39; 714/51

(58) Field of Classification Search  
None  
See application file for complete search history.

(56) References Cited

U.S. PATENT DOCUMENTS

| | | | | |
|---|---|---|---|---|
| 6,105,087 | A | * | 8/2000 | Rivoir ............................ 714/51 |
| 6,122,757 | A | * | 9/2000 | Kelley ........................... 714/39 |
| 6,138,171 | A | * | 10/2000 | Walker .......................... 719/318 |
| 6,601,193 | B1 | * | 7/2003 | Liebau ........................... 714/39 |
| 7,512,954 | B2 | * | 3/2009 | Srivastava et al. ............. 719/318 |
| 7,774,659 | B2 | * | 8/2010 | Roussel .......................... 714/39 |
| 2003/0153998 | A1 | * | 8/2003 | Clifford ......................... 714/51 |
| 2004/0102949 | A1 | | 5/2004 | Agarwala | |
| 2005/0021348 | A1 | * | 1/2005 | Chan et al. ........................ 705/1 |
| 2005/0091543 | A1 | | 4/2005 | DeRose | |
| 2005/0221266 | A1 | * | 10/2005 | Mislevy et al. ............... 434/322 |
| 2006/0085798 | A1 | * | 4/2006 | Bendiksen et al. ........... 719/318 |
| 2006/0212540 | A1 | * | 9/2006 | Chon et al. .................... 709/218 |

(Continued)

OTHER PUBLICATIONS

"Efficient Pattern Matching over Event Streams", Jagrati Agrawal, Jun. 8, 2006, pp. 1-13.*

(Continued)

*Primary Examiner* — Tuan Dao  
(74) *Attorney, Agent, or Firm* — Harness, Dickey & Pierce, P.L.C.

(57) ABSTRACT

A method is disclosed. In at least one embodiment, the method includes providing a system specification of the system; deriving a number N1 of base patterns dependent on the system specification, a base pattern representing at least one service and having a number N2 of parameterisable events and a parameterisable control section representing a control flow and/or a data flow between the events; selecting a number N3, wherein N3≦N1, of base patterns and providing a control structure representing a control flow and/or a data flow between the selected base patterns dependent on an event trace expected as a result of the system run; and providing the reference data having at least the selected base patterns and the provided control structure.

13 Claims, 5 Drawing Sheets

(56) References Cited

U.S. PATENT DOCUMENTS

| | | |
|---|---|---|
| 2006/0279443 A1 | 12/2006 | Agarwala |
| 2007/0199049 A1* | 8/2007 | Ziebell .............................. 726/3 |
| 2008/0134135 A1* | 6/2008 | Elaasar ......................... 717/104 |
| 2011/0165885 A1* | 7/2011 | Patabandi et al. ............. 455/450 |

OTHER PUBLICATIONS

"A Scenario-Matching Approach to the Description and Model Checking of Real-Time Properties", Victor Braberman, 2005, pp. 1-14.*

"Patterns for Monitoring Scenarios to Handle State Based Crosscutting Concern", Mark Mahoney, 2008, pp. 1-9.*

"From Statecharts to ESP: Programming with Events, States and Predicates for Embedded Systems", 2005, Vugranam C. Sreedhar, pp. 1-4.*

"Modeling Software with Finite State Machines", Ferdinand Wagner, 2006, pp. 1-369.*

"Automatic Diagnosis and Response to Memory Corruption Vulnerabilities", Jun Xu, 2005, pp. 1-12.*

3GPP Specifications Home; accessed, Mar. 29, 2007 Internet: http://www.3gpp.org/ specs/specs.htm.

Black, J. P., Coffin, M. H., Taylor, D. J., Kunz, T., Basten, A. A.: Linking Specifications, Abstraction, and Debugging; CCNG Technical Report E-232, Computer Communications and Network Group, University of Waterloo (1993); Others.

Cowan, R., Grosdidier, G.: Visualization Tools for Monitoring and Evaluation of Distributed Computing Systems. In Proc. of the International Conference on Computing in High Energy and Nuclear Physics, Padova, Italy (2000); Others.

Dwyer, M., Clarke, L.: Data Flow Analysis for Verifying Properties of Concurrent Programs. In Proc. of ACM SIGSOFT'94, New Orleans, LA, USA (1994); Others.

Fromentin, E., Raynal, M., Garg, V., Tomlinson, A.: On-the-Fly Testing of Regular Patterns in Distributed Computations. Internal Publication #817,IRISA, Rennes, France (1994); Book.

Hallal, H. H., Boroday, S., Petrenko, A., Ulrich, A.: A formal approach to property testing in causally consistent distributed traces. Formal Aspects of Computing 18(1), pp. 63-83. ISSN 0934-5043 (2006); Others.

Holzmann, G. J.: The SPIN Model Checker; Addison-Wesley; ISBN. Addison-Wesley, London, UK, ISBN 978-0-321-22862-8 (2004); Book.

Jard, C., Jeron, T., Jourdan, G. V., Rampon, J. X.: A General Approach to Trace-checking in Distributed Computing Systems. In Proc. of the IEEE International Conference on Distributed Computing Systems, Poznan, Poland (1994); Others.

Luckham, D., Frasca, B.: Complex Event Processing in Distributed Systems. Stanford University Technical Report CSL-TR-98-754 (1998); Others.

Pietschker, A., Ulrich, A.: A Light-weight Method for Trace Analysis to Support Fault Diagnosis in Concurrent Systems. In Proc. of the 6th World Multi conference on Systemic, Cybernetics and Informatics; Orlando, FL, USA (2002); Others.

Ulrich, A., Petrenko, A.: Reverse Engineering Models from Traces to Validate Distributed Systems—An Industrial Case Study. In: Akehurst, D. H., Vogel, R., Paige, R. F. (eds.): Proc. of the 3rd European Conference on Model-Driven Architecture—Foundations and Applications (ECMDA-FA 2007). LNCS, vol. 4530, pp. 184-193, Springer, Heidelberg (2007); Others.

Ward, P. A. S.: A Framework Algorithm for Dynamic Centralized Dimension-Bounded Timestamps. In Proc. of CASCON 2000, Mississauga, Ontario, Canada (2000); Others.

Internet: http://www.3gpp.org/ specs/specs.htm—Sep. 18, 2007.

* cited by examiner

METHOD FOR PROVIDING REFERENCE DATA FOR A DIAGNOSIS OF A SYSTEM DEPENDENT ON AN EVENT TRACE

PRIORITY STATEMENT

This application is the national phase under 35 U.S.C. §371 of PCT International Application No. PCT/EP2008/056519 which has an International filing date of May 28, 2008, which designated the United States of America, and which claims priority on European patent application numbers EP07011166 filed Jun. 6, 2007 and EP 07018397 filed Sep. 19, 2007, the entire contents of each of which are hereby incorporated herein by reference.

FIELD

At least one embodiment of the invention generally relates to a method for providing reference data for the diagnosis of a system dependent on an event trace recorded during a system run. At least one embodiment of the invention further generally relates to a computer program product, which causes the execution of such a method.

At least one embodiment of the invention generally relates to a diagnosis or validation of the behaviour of large, in particular distributed or concurrent, systems using an event trace, and in particular one or more internal event traces exchanged between system components. Specifically, the validation of large telecommunication networks, e.g. 3GPP Radio Networks composed of various network elements such as NodeBs, RNCs and others, is supported.

BACKGROUND

When a large, distributed system is analysed or tested end-to-end from the user's perspective, the result of a test run cannot be concluded alone from the behaviour observed at the test probes because of the inherent complexity of the system. Therefore, the communication at various internal interfaces of the system is recorded in a message trace or, more general, event trace and analysed in addition to decide about the correct functioning of the system.

Another issue is the diagnosis of system failures that occur during field testing or normal operation when the environment of the system it works in is much less controlled than in a test lab. Unfortunately it is hard, if not impossible, to reconstruct the failure state of the system in a lab to diagnose the failure cause. Also in this case it is helpful to collect traces of the internal communication during runtime and analyse these traces later dependent on the recorded traces.

A recorded trace can be analysed by applying an appropriate analysis tool that checks the trace against some user defined properties. Various methods and tools exist that visualize traces collected through monitoring. In addition, there are existing methods that offer means (mostly automated) to verify certain properties in the trace of a distributed system. Such a method is described e.g. in Cowan, R., Grosdidier, G.: Visualization Tools for Monitoring and Evaluation of Distributed Computing Systems; Hallal, H. H., Boroday, S., Petrenko, A., Ulrich, A.: "A formal approach to property testing in causally consistent distributed traces." These methods, however, assume a monolithic representation of an analysis pattern.

Some other methods use a so-called "event abstraction"—technology, that methods arranges sets of events recorded in a trace to form abstract events according to certain rules. Such a method is described e.g. in Black, J. P., Coffin, M. H., Taylor, D. J., Kunz, T., Basten, A. A.: "Linking Specifications, Abstractions, and Debugging" or in Luckham, D., Frasca, B.: "Complex Event Processing in Distributed Systems". Besides being used only to visualize complex event traces, this approach lacks the ability to specify a control and/or data flow among events of an analysis pattern.

SUMMARY

An embodiment of the invention is formed by a method for providing reference data for the diagnosis of a system dependent on a recorded event trace, the system providing at least a number of services, wherein the method comprises:
a) providing a system specification of the system;
b) deriving a number N1 of base patterns dependent on the system specification, a base pattern representing at least one service and having a number N2 of parameterisable events and an parameterisable control section representing a control flow and/or a data flow between the events;
c) selecting a number N3, wherein $N3 \leq N1$, of base patterns and providing a control structure representing a control flow and/or a data flow between the selected base patterns dependent on an event trace that is expected as a result of the system run; and
d) providing the desired reference data having at least the selected base patterns and the provided control structure.

Another embodiment of the invention may provide a computer program product, for storing a program having instructions for the execution of the method according to an embodiment of the present invention.

An aspect of an embodiment of the present invention is to define the so-called base patterns BP first and then to combine those to obtain more complex patterns to represent the reference data, in the further also called composite pattern. A base pattern BP describes in particular a certain service taken place between relevant components of the system, in particular a distributed system. As a result, it is proposed to use the so-called base patterns BP, which describe in a sense an atomic portion of the system behaviour and to combine them according to the needs of the analysis task for given event trace, which can e.g. be a message trace. The base patterns BP can be derived from the system specification that does not need to be complete and could reflect only a certain aspect of said system. The composition of the base patterns BP can be postponed up to the point when the actual event trace has been recorded and the context of the system and/or the test case is known, under which the trace has been produced. Further details such as the analysis pattern or reference data can be composed from the base patterns BP used as independent building blocks.

At least one embodiment of the present invention allows more flexibility and fosters re-use of base patterns BP such that the analysis of event traces such as message traces can be performed faster and on a higher level of detail. In particular, at least one embodiment of the present invention supports the specification approach that has been established in the telecommunication domain. For example, functions of a 3GPP Radio Network are described in terms of protocol procedures: 3GPP Specifications Home, accessed on Mar. 29, 2007 on the website http://www.3gpp.org/sp. Each procedure is described by the flow of a certain set of messages, wherein each message can constitute an event according to the present invention. As a result, a protocol procedure can be described by a base pattern BP having at least such an event. The corresponding combination of protocol procedures provides the means to set-up a certain network service. Therefore, such a service can easily be described as a composition of needed base patterns. Moreover, the present invention allows an automated execution of the analysis of a recorded event trace, in particular the execution of a trace analysis.

Further, for example UML2 sequence diagrams or message sequence charts (MSCs) supporting alternative, parallel, iterative, optional and other behaviour specifications can be used to specify the behaviour of base patterns. Other behavioural diagram types such as state charts, state machines or UML2 activity diagrams could be used as well.

Components to base patterns BP are the events (messages) as they are expected in a related event (message) trace. Typically a base pattern encodes the behaviour that the system should normally exhibit (the expected behaviour). But they can be also used to formulate undesired behaviour, e.g. the occurrence of unexpected (error) messages. Moreover, base patterns BP can be made adjustable by inserting parameters to certain data fields or message data fields to make the base patterns BP applicable for other traces and re-usable for other system validation tasks. Classifying and storing base patterns BP in a library fosters re-use and reduces total validation efforts.

In a system validation task, the system engineer can decide what kind of services the recorded trace of a system run, e.g. as observed during an execution of a test case, should contain and in what order they should occur. He can take out the required base patterns BP from a library if available or creates them beforehand. In a next step, the base patterns BP are composed e.g. in a UML2 activity diagram to specify the expected order of their occurrence in the trace.

The following list describes the possible ways to compose base patterns BP:

Sequentially: The last event (message) of the first base pattern occurs before the first event (message) of the second one.

Concurrently: The events (messages) of two base patterns can interleave.

Alternatively: If the events (messages) of the first base patterns appear in a certain trace segment, the events (messages) of the second pattern shall not occur in the same segment.

Iteratively: The events (messages) of a base pattern are repeated for a number of times.

Recurrently: Any composition of base patterns results in a new base pattern.

An approach for pattern composition can be to convert each base pattern BP into an extended finite state machine FSM and to join the start and end states of two base patterns BP according to the composition operators mentioned above. In this way, a finite state representation can be obtained for the UML2 activity diagram description of the composite pattern that is the input to the subsequent trace analysis step.

At least one embodiment of the present invention can be used, for example, for regression testing of radio network elements to validate the correct execution of user scenarios. As a result, the validation task becomes much simpler because by means of the present invention the large trace files that are typically produced during a test run can be processed and analysed automatically and it is possible to quickly decide about the correct functioning of network services. Furthermore, the graphical representation of the base patterns BP and composite patterns is in particular helpful to better understand the analysis results.

DETAILED DESCRIPTION OF EXAMPLE EMBODIMENTS

The following aspects and embodiments of the invention are illustrated and described with reference to the drawings.

Figure 1:
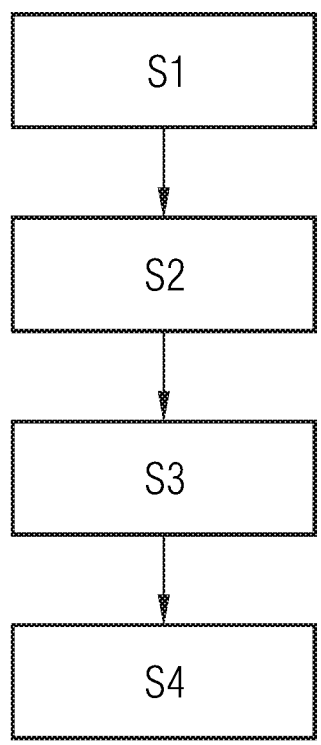
FIG. 1 is a flow chart for illustrating an embodiment of a method according to the present invention for providing reference data for a diagnosis of a system dependent on a recorded event trace.

Referring to FIG. 1 an embodiment of a method for providing reference data 1 for a diagnosis 2 of a system 3 dependent on a recorded event trace 4 during a system run is illustrated. In the following, an embodiment of the method according to the present invention having the steps S1 to S4 is described by way of the flow chart diagram of FIG. 1 with reference to FIGS. 2 to 4.

Figure 2:
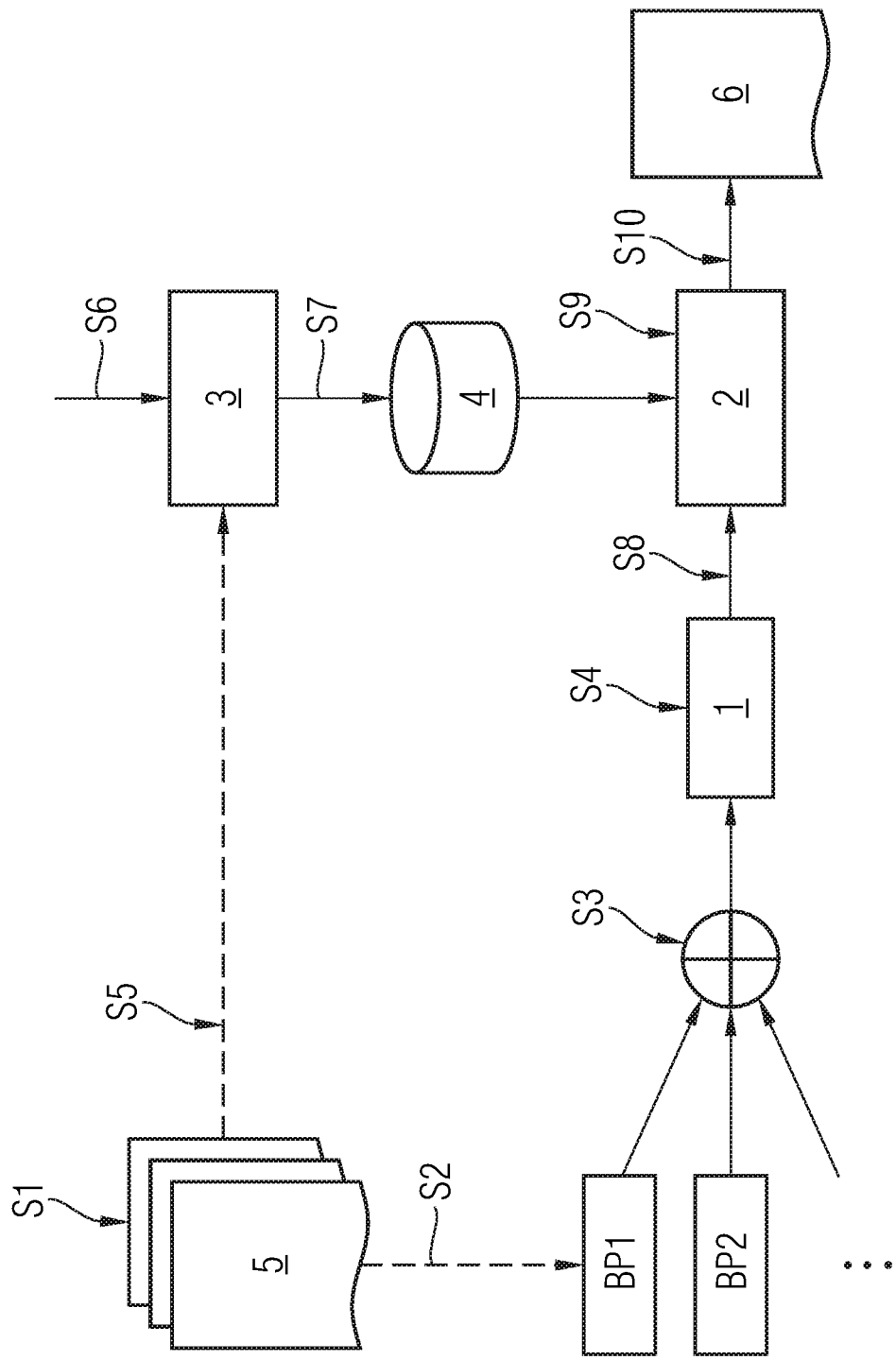
FIG. 2 is a diagram for illustrating an embodiment of an arrangement for executing a diagnosis of a system dependent on a recorded event trace.

Further method steps S5 to S10 are described in particular with reference to FIG. 2 illustrating an embodiment of an arrangement for executing a diagnosis of a system 3 dependent on a recorded event trace 4 during a system run:

Step S1:

First, a system specification 5 of the system 3 is provided. In particular, the system 3 is represented as a communication network, e.g. as a 3GPP UMTS Radio Network. Further, the system run can be a test run. Further, the system 3 can be constituted as a number N4 of concurrent sub-systems.

Step S2:

A number N1 of base patterns BP1, BP2 are derived dependent on a system specification 5, a base pattern BP1, BP2 representing at least one service and having a number N2 of parameterisable events E1, E2 and an parameterisable control section CSE representing a control flow and/or a data flow between the events E1, E2. Preferably, an event E1, E2 is represented as a communication message. Further, a base pattern BP1, BP2 can represent a behaviour part of the system 3 or of one of the sub-systems of the system 3.

Figure 3:
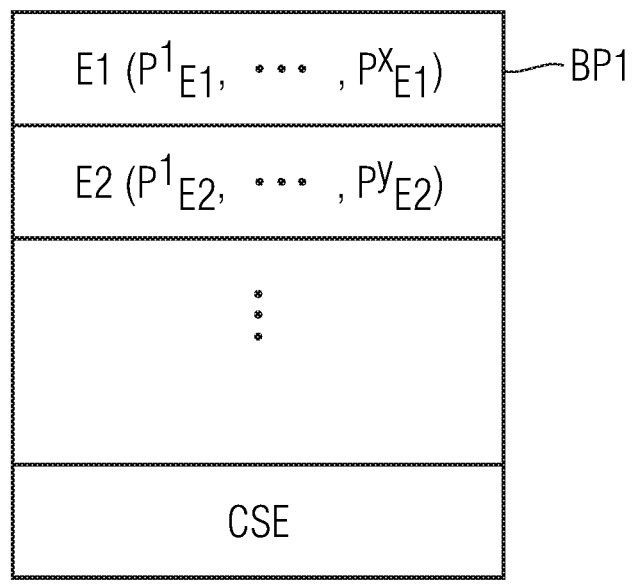
FIG. 3 is a diagram showing an embodiment of a base pattern.
Figure 4:
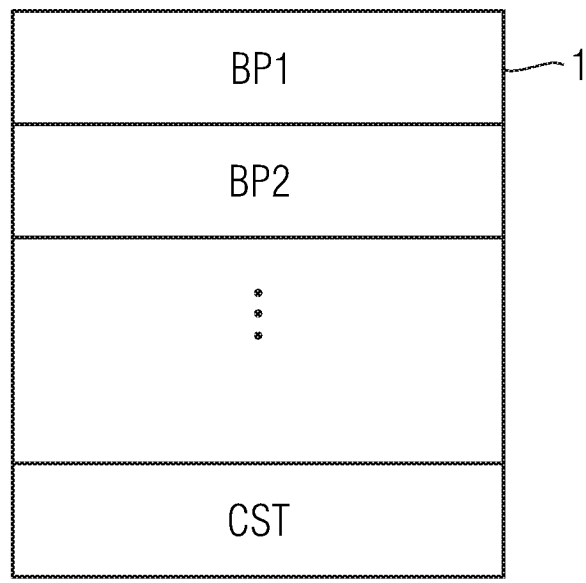
FIG. 4 is a diagram showing an embodiment of a composite pattern.

In this regard, FIG. 3 illustrates a block diagram of an embodiment of a base pattern BP1 which has two events: E1 ($P_{E1}^1, \ldots, P_{E1}^x$); E2 ($P_{E2}^1, \ldots, P_{E2}^y$) and the control section CSE representing the control flow and the data flow between the events E1, E2 has an example, the first event E1 has a number of x parameters, $P_{E1}^1, \ldots, P_{E1}^x$, wherein x is a natural number.

Further, the second event E2 has y parameters, $P_{E2}^y$, wherein y is a natural number. The parameters $P_{E2}^1, \ldots, P_{E2}^1, \ldots, P_{E2}^y$ allow to adjust the events E1 and E2, respectively, dependent on an intended event trace expected as a result of the system run.

Step S3:

Dependent on an event trace expected as a result of the system run, a number N3, with N3≦N1, of base patterns BP1, BP2 and a control structure CST is provided, the control structure representing a control flow and/or a data flow between the selected base patterns BP1, BP2. The event trace expected as a result of the system run can be used for a diagnosis of the system 3. Further, the control section CSE and/or the control structure CST can be represented as a state machine or as a sequence diagram or as an activity diagram or in another notation capable to express operational semantics. Additionally, at least one event E1, E2, at least one control section CSE and/or at least one control structure CST can be adjusted dependent on the systems specification 5 and/or dependent on the system run.

Preferably, the events E1, E2, in particular communication messages, of the base pattern BP1, BP2 is provided with at least one data field, which is particularly adjustable by parameterisation.

Furthermore, at least one parameter of said data field of the event, in particular of the communication message, of the base patterns BP1, BP2 can be set before the diagnosis of the recorded event trace dependent on the system run. Also, at least one parameter of the data field can be transferred to another base pattern. BP1, BP2 during the system run as expressed in the data flow of the control structure CST of the composite pattern.

Step S4:

In step S4 the desired data having at least the selected base patterns and the control structure are provided.

In addition to steps S1-S4, an embodiment of the method according to the present invention can have the steps S5 to S10, which are in particular described with reference to FIG. 2.

Step S5:

The system 3 is implemented on the basis of the provided system description 5.

Step S6:

A test case is provided in accordance with the provided reference data 1.

Step S7:

In the following, the system 3 is under observation during the execution of the provided test case to provide the recorded event trace 4, which represents a sequence of events, in particular communication messages.

Step S8:

The parameters of the composite pattern 1 comprising the respective base patterns BP1, BP2 are set. In this regard, the composite pattern 1 is initiated or set before the diagnosis by replacing the formal parameters of the base patterns BP1, BP2 by actual values that correspond to the performed system run. This step requires that the internal communication of the distributed system 3 under observation is recorded. Then, the analysis of the recorded event trace can be automated, advantageously.

Step S9:

The recorded event trace 4 is supplied to a trace analysis system to support the diagnosis of the system 3 under observation.

Further, the trace analysis is executed using the provided recorded event trace 4 and the composite pattern 1, which is instantiated, i.e. does not contain any free formal parameters. One automated approach for such an analysis is described in: "Ulrich, A., Petrenko, A.: Reverse Engineering Model from Traces to Validate Distributed Systems—An Industrial Case Study. In: Akehurst, D. H., Vogel, R., Paige, R. F. (eds.): Proc. of the 3$^{rd}$ European Conference on Model-Driven Architecture—Foundations and Applications (ECMDA-FA 2007). LNCS, vol. 4530, pp. 184-193. Springer, Heidelberg (2007)".

Step S10:

The results 6 of the analysis 2 are provided. In this regard, the results of the analysis 2 are a report whether the property described in the composite pattern 1 is contained in the recorded event trace 4 or not. In a negative case, an error scenario is produced that depicts a sequence of events (messages) from the initial event (message) in the trace up to the point where the behaviour recorded in the trace diverges from the behaviour as prescribed in the composite pattern 1. This scenario is a helpful means to system engineers to further analyse the cause of the fault.

Figure 5:
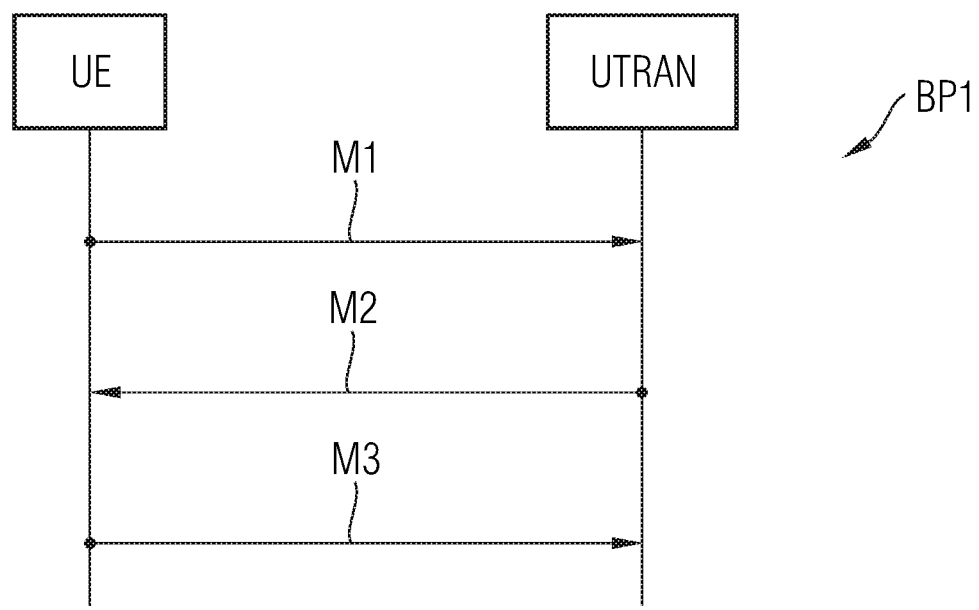
FIG. 5 is a UML2 sequence diagram showing an embodiment of a base pattern.
Figure 6:
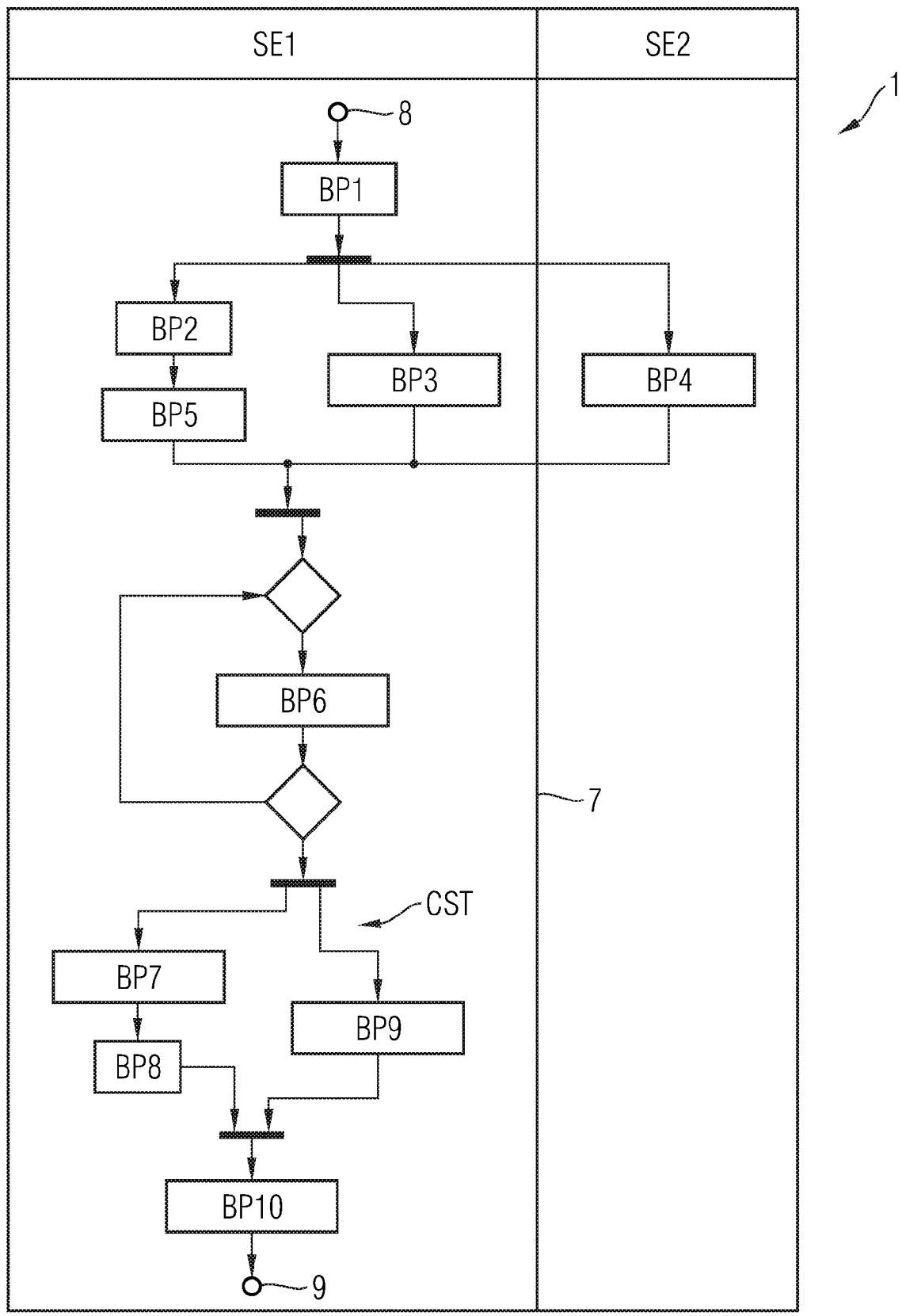
FIG. 6 is a UML2 activity diagram showing an embodiment of a composite pattern that uses the base pattern of FIG. 5.

FIGS. 5 and 6 show an example of a base pattern BP and a composite pattern related to a test case implementing a user scenario that tests the execution of a package-switched call between two mobile phones in a UMTS Radio Network in order to transfer data from one mobile phone to the other one using the FTP command. In this regard, FIG. 5 illustrates a UML2 sequence diagram of a base pattern BP1 and FIG. 6 illustrates a UML2 activity diagram of an embodiment of a composite pattern 1 including the base pattern BP1 of FIG. 5.

As can be seen from FIG. 6 each service is described as a base pattern BP1-BP10 and combined with others according to their logical occurrence and ordering in the user scenario as recorded in the trace. In this regard, FIG. 5 shows the message flow of the so-called "RRC connection establishment procedure" that is issued each time a mobile phone attempts to establish a connection. Therefore, the example of the base pattern BP1 of FIG. 5 represents a RRC connection establishment. The events according to this example are constituted as messages M1 to M3 transferred between e.g. a user equipment UE and a UMTS terrestrial radio network UTRAN. In FIG. 5, M1 corresponds to a RRC Connection Request, M2 to a RRC Connection Set-up and M3 to a RRC Connection Set-up Complete message.

FIG. 6 illustrates a set of base patterns BP1 to BP10 combined in a composite pattern 1 to reflect the expected behaviour of the user scenario in the trace. FIG. 6 shows an UML2 activity diagram, which uses a swim lane 7 for each service group SE1 and SE2, formed by a RRC and a GPRS service group, respectively. This kind of structuring improves the legibility of the diagram significantly.

The composite pattern 1 shown in FIG. 6 comprises base patterns BP1 to BP10 and a control structure CST. The control structure CST is represented by conjunctions or connections of the base patterns BP1 to BP10, in particular represented as arrows. Further, FIG. 6 shows a start state 8 and an end state 9 of the composite pattern 1.

Furthermore, the composite pattern 1 as shown in FIG. 6 can be transformed next into a computer-processable representation that makes it possible to use it in an automated trace analysis step (step S9 of FIG. 2).

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A method for providing data to support a diagnosis of a system dependent on an event trace recorded during a system run, the system providing at least a number of services, the method comprising:

providing a system specification of the system;

deriving a number N1 (N1>1) of base patterns dependent on the system specification, each base pattern representing at least one service and having a number N2 (N2>1) of parameterisable events and a parameterisable control section representing at least one of a control flow and a data flow between the parameterisable events;

selecting a number N3 (N3>0), wherein N3≦N1, of base patterns and providing a control structure representing at least one of a control flow and a data flow between the selected base patterns, the number N3 of base patterns being dependent on an event trace expected as a result of the system run; and providing the data, the data including at least the selected base patterns and the provided control structure.

2. The method of claim 1, further comprising:
representing at least one of the parameterisable control section and the control structure as a state machine, a sequence diagram, an activity diagram or any other notation capable expressing operational semantics.

3. The method of claim 1, further comprising:
storing at least one of the derived base patterns and the provided reference data for a re-use.

4. The method of claim 2, further comprising:
representing at least one of the system as a communication network, each parameterisable event as a communication message, the system run as a test run, and the event trace as a message trace.

5. The method of claim 4, further comprising:
parameterizing at least one of
   at least one of the parameterisable events,
   at least the parameterisable control section, and
   at least the control structure,
   the parametrizing being dependent on the system specification and the system run.

6. The method of claim 4, further comprising:
providing each parameterisable event of the number N3 of base patterns with at least one data field.

7. The method of claim 6, further comprising:
setting at least one parameter of the at least one data field of each parameterisable event of the number N3 of base patterns before an analysis of the recorded event trace dependent on the test run.

8. The method of claim 1, further comprising:
constituting the system as a number N4 (N4>0) of concurrent subsystems, wherein each base pattern represents a re-occurring behavior part of the system or one or more subsystems.

9. The method of claim 4, wherein the communication network is a 3GPP UMTS (3rd Generation Partnership Project Universal Mobile Telecommunications System) Radio Network.

10. The method of claim 6, wherein each parameterisable event is represented as a communication message, and wherein the at least one data field is adjustable.

11. The method of claim 10, further comprising:
setting at least one parameter of the at least one data field of the communication message, of the number N3 of base patterns before the analysis of the recorded event trace dependent on the test run.

12. A computer program product, comprising:
a non-transitory computer readable medium including instructions embedded thereon, which, when executed on a program-controlled device, execute the method of claim 1 on the program-controlled device.

13. A non-transitory computer readable medium including program segments for, when executed on a computer device, causing the computer device to implement the method of claim 1.

* * * * *